US012498088B2

(12) United States Patent
Jiang et al.

(10) Patent No.: US 12,498,088 B2
(45) Date of Patent: Dec. 16, 2025

(54) LIGHTING APPARATUS HAVING ADJUSTABLE LIGHT WINGS WITH LENS COVER

(71) Applicant: LEEDARSON LIGHTING CO., LTD., Fujian (CN)

(72) Inventors: Tingwei Jiang, Fujian (CN); Tiansong Lan, Fujian (CN); Jiansheng Zhang, Fujian (CN); Junjie Lin, Fujian (CN); Youfeng Su, Fujian (CN); Haiyan Chen, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 18/936,461

(22) Filed: Nov. 4, 2024

(65) Prior Publication Data

US 2025/0146632 A1 May 8, 2025

(30) Foreign Application Priority Data

Nov. 2, 2023 (CN) ......................... 202322965022.9

(51) Int. Cl.

*F21V 21/30* (2006.01)
*F21S 2/00* (2016.01)
*F21V 17/12* (2006.01)
*F21V 17/16* (2006.01)
*F21V 23/06* (2006.01)
*F21Y 115/10* (2016.01)

(52) U.S. Cl.

CPC .............. *F21S 2/005* (2013.01); *F21V 17/12* (2013.01); *F21V 17/162* (2013.01); *F21V 21/30* (2013.01); *F21V 23/06* (2013.01); *F21Y 2115/10* (2016.08)

(58) Field of Classification Search

CPC ...... F21V 15/015; F21V 21/30; F21V 17/002; F21V 15/01; F21V 21/26; F21V 21/28; F21V 21/29; F21V 21/14; F21S 8/046; F21S 2/005; F21S 8/04

See application file for complete search history.

(56) References Cited

U.S. PATENT DOCUMENTS 6,100,803 A * 8/2000 Chang ...................... F21V 21/30 250/221
6,264,350 B1 * 7/2001 Swanson ................. F21V 21/30 362/410
7,101,056 B2 * 9/2006 Pare ......................... G09F 13/14 362/249.03
7,810,955 B2 * 10/2010 Stimac ..................... F21V 29/70 362/373
8,075,164 B2 * 12/2011 Xiao ........................ F21V 23/02 362/373
8,616,757 B2 * 12/2013 Leadford .................. F21S 4/28 362/648

(Continued)

*Primary Examiner* — Ismael Negron
(74) *Attorney, Agent, or Firm* — LANWAY IPR SERVICES; Chun-Ming Shih

(57) ABSTRACT

A lighting apparatus includes a driver housing, and first and second light wings each coupled to two sides of the driver housing. Each light wing includes a lens plate, an LED module for emitting light through the lens plate and out a light opening, a lens entrance for receiving the lens into the light wing, and a lens cover for concealing the lens entrance. The first and second light wings are adjustable with respect to the driver housing.

19 Claims, 11 Drawing Sheets

(56) References Cited

U.S. PATENT DOCUMENTS

| | | | | |
|---|---|---|---|---|
| 8,622,592 | B1 * | 1/2014 | Liu | F21S 8/04 362/373 |
| 9,157,622 | B2 * | 10/2015 | Yanping | F21V 21/025 |
| 9,205,774 | B2 * | 12/2015 | Kennemer | F21V 21/30 |
| 10,001,252 | B2 * | 6/2018 | Inskeep | F21V 21/30 |
| 10,429,013 | B1 * | 10/2019 | Fang | F21V 21/30 |
| 11,402,089 | B2 * | 8/2022 | Leifker | A01G 9/249 |
| 11,480,318 | B1 * | 10/2022 | Xu | F21V 21/40 |
| 11,543,101 | B2 * | 1/2023 | Kaye | F21V 21/30 |
| 11,635,565 | B2 * | 4/2023 | Ju | G02B 6/0088 362/606 |
| 11,835,189 | B1 * | 12/2023 | Bai | F21V 21/30 |
| 2007/0047229 | A1 * | 3/2007 | Lee | F21V 15/013 362/240 |
| 2008/0089071 | A1 * | 4/2008 | Wang | F21V 29/75 362/294 |
| 2010/0309662 | A1 * | 12/2010 | Zheng | F21V 29/763 362/249.02 |
| 2011/0156584 | A1 * | 6/2011 | Kim | F21K 9/232 315/32 |
| 2013/0271993 | A1 * | 10/2013 | Jan | F21V 21/30 362/249.1 |
| 2017/0299124 | A1 * | 10/2017 | Hsu | F21V 21/116 |
| 2018/0202639 | A1 * | 7/2018 | Kao | F21V 21/30 |
| 2018/0213627 | A1 * | 7/2018 | Xia | F21V 21/26 |
| 2018/0320885 | A1 * | 11/2018 | Musser | F21V 29/89 |
| 2025/0052407 | A1 * | 2/2025 | Yang | F21V 21/28 |

* cited by examiner

LIGHTING APPARATUS HAVING ADJUSTABLE LIGHT WINGS WITH LENS COVER

FIELD

The present invention is related to a lighting apparatus, and more particularly related to a lighting apparatus with flexible component management.

BACKGROUND

LED modules have revolutionized lighting design, especially in industrial and commercial environments, where energy efficiency, flexibility, and cost-effectiveness are crucial. LED technology, known for its long lifespan and low energy consumption, has quickly become the preferred choice in these sectors. LED modules are self-contained units, combining LEDs with their circuitry, often in a compact and easy-to-install format. This modular design not only simplifies installation but also allows for easy replacement, an essential feature in settings where downtime can be costly. Their efficient energy usage results in lower utility costs, meeting sustainability goals while delivering substantial operational savings.

One of the main advantages of LED modules is their flexibility, making them suitable for a variety of applications and configurations. LED modules come in various shapes, sizes, and brightness levels, enabling designers to use them in everything from small accent lights to large-scale illumination systems. For instance, retail spaces often require different lighting intensities and hues for distinct sections. Here, LED modules can be used to highlight displays with vibrant colors or create subtle ambiance lighting, all while being energy-efficient and aesthetically pleasing. The adaptability of LED modules allows designers to achieve the desired lighting effects without compromising on performance or sustainability.

Durability is another crucial factor that makes LED modules popular in industrial and commercial applications. These modules are designed to withstand harsh environments, including exposure to dust, moisture, and extreme temperatures. This resilience makes them ideal for industrial spaces like warehouses and manufacturing facilities, where traditional lighting may be susceptible to frequent wear and tear. The durability of LED modules not only ensures consistent performance over time but also reduces maintenance costs, as they require less frequent replacements compared to other lighting technologies.

The industrial and commercial sectors demand lighting that can be easily configured and adapted to changing requirements, and LED modules meet this need well. Many LED modules offer customizable settings, such as adjustable brightness and color temperature, which can be controlled manually or via automated systems. This adaptability is especially beneficial in environments where lighting needs may vary throughout the day or in different work zones. For instance, in a manufacturing plant, bright lighting may be essential in the assembly area, while a softer, more focused light might be preferred in administrative zones.

LED modules are used in various lighting devices, each tailored to different design needs. For example, downlights, panel lights, and floodlights are commonly used in commercial spaces. Downlights provide focused illumination, suitable for office areas and meeting rooms, while panel lights offer broad, uniform lighting ideal for workspaces that require high visibility. Floodlights, on the other hand, are frequently used in outdoor or large indoor areas like warehouses and sports facilities, delivering powerful illumination over a wide area. Each of these devices utilizes LED modules, which enhance their energy efficiency and flexibility.

The environmental benefits of LED modules also play a significant role in their widespread adoption. LED lighting technology consumes less electricity than conventional lighting, helping reduce greenhouse gas emissions. Moreover, LED modules are often recyclable and contain no harmful materials like mercury, which is commonly found in fluorescent lighting. Many companies choose LED modules as part of their efforts to meet environmental regulations and reduce their carbon footprint, aligning with global sustainability goals.

Cost reduction is a critical consideration in the commercial and industrial sectors, where lighting expenses can constitute a large portion of operational costs. Although LED modules may have a higher initial cost compared to traditional lighting options, their long-term savings make them a cost-effective choice. Their low energy consumption translates to lower electricity bills, while their durability reduces replacement costs. Additionally, the modularity of LED lighting systems allows for incremental upgrades, which means that companies can invest in improvements over time without needing to overhaul entire lighting systems.

Another appealing feature of LED modules is their ease of installation and replacement. Modular design allows for simple setup and swift replacements, making LED lighting systems easier to maintain than traditional lighting. This is especially advantageous in large facilities, where the time and labor required for lighting maintenance can be substantial. For instance, in a warehouse setting, replacing a damaged lighting fixture can be time-consuming and disruptive. With LED modules, however, faulty components can be swapped out without needing to dismantle the entire fixture.

Furthermore, LED modules support sophisticated lighting control systems, enabling features like dimming, color-changing, and even smart lighting that adjusts based on occupancy or daylight availability. This level of control is particularly useful in commercial spaces such as hotels, where lighting needs vary widely across different areas. A conference room, for example, may need bright lighting for meetings but softer lighting for presentations or evening events. With LED modules, facilities can easily adapt to these different requirements, enhancing both functionality and energy efficiency.

LED modules are a preferred lighting solution in industrial and commercial settings due to their energy efficiency, durability, flexibility, and ease of use. They offer a versatile, environmentally friendly, and cost-effective alternative to traditional lighting, with modularity allowing for easy configuration and upgrades. These benefits, combined with the potential for substantial cost savings and a reduced carbon footprint, make LED modules a valuable asset in modern lighting design, supporting companies' operational and sustainability goals.

SUMMARY

In some embodiments, a lighting apparatus includes a driver housing, a first LED module, a first lens plate, a second LED module, a second lens plate, a first light wing, a second light wing, a first lens cover and a second lens cover.

The first LED module emits a first light. The second LED module emits a second light.

The first light wing has a first light opening and a first lens entrance. The first light passes through the first lens plate to escape from the first light opening.

The first light wing and the second wing are disposed on two sides of the driver housing.

The second light wing has a second light opening and a second lens entrance. The second light passes through the second lens plate to escape from the second light opening.

The first lens cover is used for concealing the first lens entrance. The second lens cover is used for concealing the second lens entrance.

In some embodiments, the first lens cover is operable to expose the first lens entrance for removing the first lens plate.

In some embodiments, the first lens entrance is located at a first lateral wall of the first light wing.

The first lens cover is attached to the first lateral wall with a first connector.

When the first lens cover is operated to expose the first lens entrance, the first connector is still attached to the first lateral wall.

In some embodiments, the first lens cover further has a first attaching unit.

The first attaching unit and the first connector are disposed on two sides of the first lens cover.

The first attaching unit and the first connector together attach the first lens cover to conceal the first lens entrance.

In some embodiments, the first attaching unit is a screw.

In some embodiments, the first attaching unit is an elastic block to squeeze into a lock hole aside the first lens entrance.

In some embodiments, the first lens cover is made of elastic plastic material, and the first lens cover is squeezed to fit to the first lens entrance to conceal the first lens entrance.

In some embodiments, the first lens plate is a first light guide plate.

The first LED module emits the first light into a first lateral surface of the first light guide plate.

The first lateral surface is perpendicular to the first light opening.

In some embodiments, the first lens plate has multiple convex-concave lens structure for diffusing the first light.

In some embodiments, the first light wing has a first sliding track for sliding the first lens plate into the first light wing.

In some embodiments, the first siding track has multiple sub-tracks for placing the first lens cover with different distances to the first LED module.

In some embodiments, a first manual switch is disposed aside the first lens entrance for users to set a light setting of the first LED module.

The first manual switch is concealed by the first lens cover.

The first manual switch is exposed when the first lens cover is partly detached from the first lens entrance.

In some embodiments, the first LED module and the first lens plate are integrated as a replaceable module to be replaced from the first lens entrance.

In some embodiments, the lens cover has electrode for routing a driving current from a driver in the driver housing to the first LED module.

In some embodiments, the first LED module has a power socket.

The first lens cover has a power pin to insert into the power socket of the first LED module.

In some embodiments, the first lens cover is attached to the first light wing using a connection of the power socket and the power pin.

In some embodiments, the driver housing has a installation groove for inserting the first light wing.

In some embodiments, the first light wing is rotatable with respect to the driver housing to change a direction of the first light.

In some embodiments, a rotation shaft is used for fixing the first light wing to the driver housing.

In some embodiments, the first wing is operated with at least two rotation axes.

DETAILED DESCRIPTION

Figure 5:
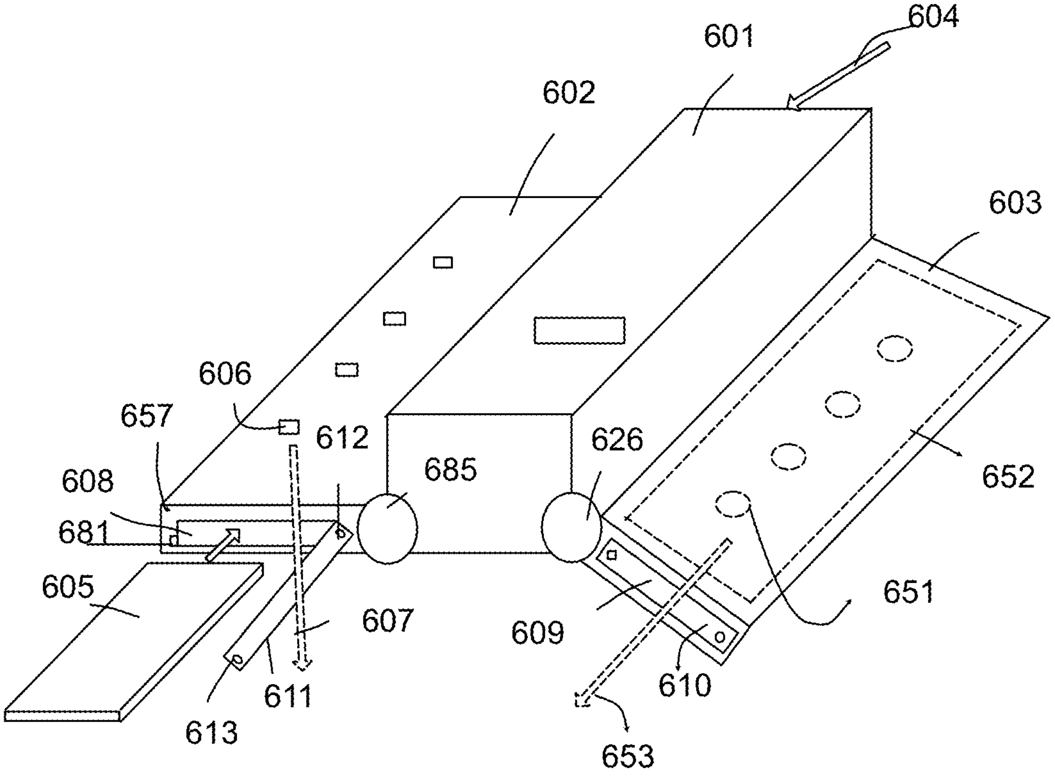
FIG. 5 illustrates another lighting apparatus embodiment.

In FIG. 5, a lighting apparatus includes a driver housing 601, a first LED module 606, a first lens plate 605, a second LED module 651, a second lens plate 652, a first light wing 602, a second light wing 603, a first lens cover 611 and a second lens cover 610.

The first LED module 606 emits a first light 607. The second LED module 652 emits a second light 653.

The first LED module 606 emits a first light 607. The second LED module 651 emits a second light 653.

Figure 8:
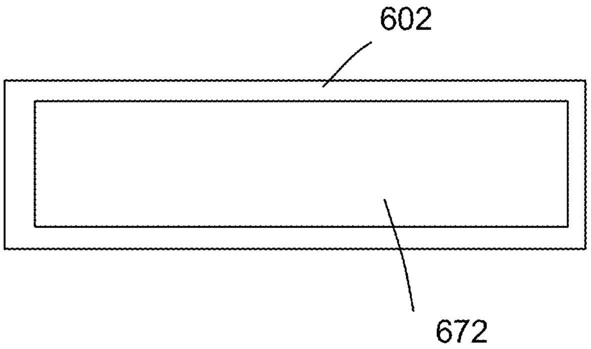
FIG. 8 shows a light opening example.

Please also refer to FIG. 8, which shows a bottom view. In FIG. 8, the bottom size of the first light wing 602 has a first light opening 672. The second wing 603 may have the structure and thus is not illustrated for brevity.

The first light wing 602 and the second wing 603 are disposed on two sides of the driver housing 601.

The second light wing 603 has a second light opening and a second lens entrance 609. The second light passes 653 through the second lens plate 652 to escape from the second light opening.

The first lens cover 611 is used for concealing the first lens entrance 608. The second lens cover 610 is used for concealing the second lens entrance 609.

In FIG. 5, the first lens cover 611 is operated to expose the lens entrance 608 to insert the first lens plate 605. The second lens cover 610 conceals the second lens entrance 609.

In some embodiments, the first lens cover is operable to expose the first lens entrance for removing the first lens plate.

In some embodiments, the first lens entrance 608 is located at a first lateral wall 657 of the first light wing 602.

The first lens cover 611 is attached to the first lateral wall 657 with a first connector 612.

When the first lens cover 611 is operated to expose the first lens entrance 608, the first connector 612 is still attached to the first lateral wall 657.

This design offers several key advantages, particularly in making lens replacement or maintenance more user-friendly. By attaching the first lens cover to the lateral wall with a secure connector, the lens cover remains fixed in place even when opened. This design prevents the cover from being fully detached and eliminates the need for the user to hold or set the cover aside during lens replacement. For users performing maintenance at elevated or challenging locations, such as high walls or overhead fixtures, this feature reduces the risk of dropping the cover, enhancing safety and convenience.

Another benefit of this configuration is the ease and efficiency it brings to maintenance tasks. Since the lens cover does not need to be manually held or temporarily stored, users can focus fully on accessing and replacing the lens plate without interruption. This design minimizes the number of steps required to open, hold, and reattach the cover, making the process smoother and more streamlined. In settings where frequent lens changes or maintenance are necessary, this design can significantly reduce time and effort, contributing to better productivity and overall ease of use.

Additionally, the design's secure attachment mechanism provides greater durability and reliability. The fixed connection of the cover to the lateral wall reduces wear and tear on the components since they do not require repeated removal and reattachment. This robust setup is particularly beneficial in industrial or commercial environments, where equipment is often subject to regular use and potential handling stresses. By keeping the lens cover connected, the design supports long-term stability and ensures that each component remains properly aligned, reducing maintenance costs and enhancing the lifespan of the system.

In some embodiments, the first lens cover further has a first attaching unit 613.

The first attaching unit 613 and the first connector 612 are disposed on two sides of the first lens cover 611.

The first attaching unit 613 and the first connector 612 together attach the first lens cover 611 to conceal the first lens entrance 608.

In some embodiments, the first attaching unit 613 is a screw.

In some embodiments, the first attaching unit is an elastic block to squeeze into a lock hole aside the first lens entrance.

Figure 10:
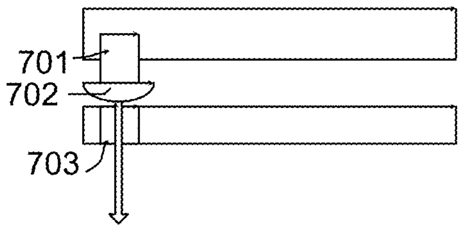
FIG. 10 shows an attaching unit example.

FIG. 10 shows such an example, the first attaching unit 701 is a rubber block has a reverse hook 702 at its front end. Users presses the first attaching unit 701 into the lock hole 703 of the lateral wall of the first wing aside the first lens entrance.

This design significantly simplifies the process of securing the lens cover by using an elastic rubber block with a reverse hook at the front. When the user presses the elastic block into the lock hole near the lens entrance, the block compresses, easily sliding into place without requiring additional fasteners or tools. The elasticity of the rubber material allows it to adapt to the dimensions of the lock hole, creating a snug fit that enhances stability while maintaining ease of installation. This approach not only speeds up the assembly process but also minimizes the effort needed from the user, as the block naturally aligns and settles into position.

The inclusion of a reverse hook on the rubber block adds a reliable locking mechanism that keeps the lens cover securely in place. Once inserted, the reverse hook prevents the lens cover from shifting or becoming detached without intentional removal, ensuring that the lens entrance remains concealed and protected. This secure locking feature also eliminates the need for complex locking systems, as the cover remains attached until an external force is applied to remove it. This design choice improves durability and prevents accidental exposure of the lens entrance, making it a practical solution for both quick access and dependable sealing.

In some embodiments, the first lens cover is made of elastic plastic material, and the first lens cover is squeezed to fit to the first lens entrance to conceal the first lens entrance.

In some embodiments, the first lens plate is a first light guide plate.

Figure 7:
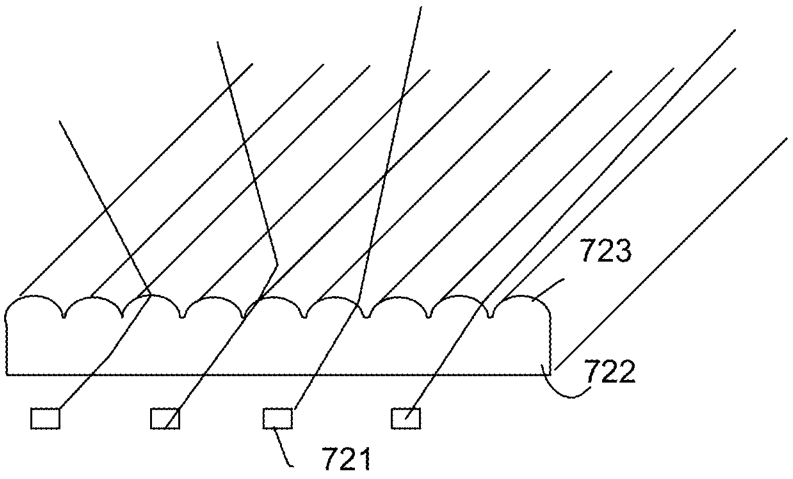
FIG. 7 shows a light guide plate example.

FIG. 7 shows such an example. Instead of placing the lens plate below the LED module. In the example of FIG. 7, the LED module 721 emits a light from a lateral side of the light guide plate 722, the light is reflected and refracted via the light output surface.

The first LED module emits the first light into a first lateral surface of the first light guide plate.

The first lateral surface is perpendicular to the first light opening.

In some embodiments, the first lens plate has multiple convex-concave lens structure 723 for diffusing the first light, as illustrated in FIG. 7.

The inclusion of multiple convex-concave lens structures on the first lens plate enhances the diffusion of the output light, resulting in a more even and uniform light distribution. Each convex-concave lens structure acts as a small diffuser, scattering light as it passes through. This scattering effect reduces harsh spots and spreads light across a wider area, creating a softer and more homogeneous illumination. By diffusing the light at multiple points on the lens plate, the design ensures that any concentrated light sources or bright spots are evenly dispersed, which improves the overall quality and consistency of the output.

Furthermore, the multiple convex-concave structures work together to provide a greater degree of light manipulation, enabling precise control over the distribution pattern. This is especially beneficial in settings where uniform lighting is essential, such as in industrial or commercial environments, where even illumination can reduce eye strain and enhance visibility. By ensuring that light is evenly spread, the design reduces glare and unwanted shadows, creating a more comfortable and effective lighting experience.

In some embodiments, the first light wing has a first sliding track for sliding the first lens plate into the first light wing.

In some embodiments, the first siding track has multiple sub-tracks for placing the first lens cover with different distances to the first LED module.

Figure 6:
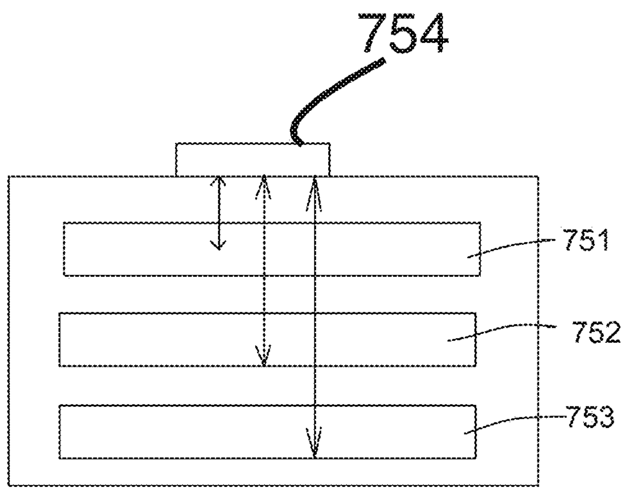
FIG. 6 illustrates a multi-track structure for inserting a lens plate at different positions.

FIG. 6 shows there are three sub-tracks 751, 752, 753 that provide three different distance from the LED module 754 to provide different light output pattern, e.g. light beam spreading angles.

In FIG. 5, a first manual switch 681 is disposed aside the first lens entrance 608 for users to set a light setting of the first LED module.

The first manual switch 681 is concealed by the first lens cover 611.

The first manual switch 681 is exposed when the first lens cover 611 is partly detached from the first lens entrance 608.

In some embodiments, the first LED module 802 and the first lens plate 803 are integrated as a replaceable module to be replaced from the first lens entrance.

Figure 11:
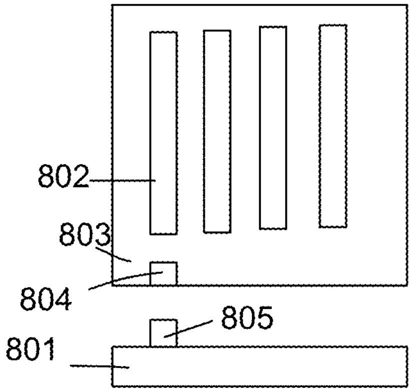
FIG. 11 shows disposing electrode to the lens cover.

In FIG. 11, the lens cover has electrode 805 for routing a driving current, e.g. driving current 604 in FIG. 5, from a driver in the driver housing to the first LED module.

In FIG. 11, the first LED module has a power socket 804. The first lens cover 801 has a power pin as the electrode 805 to insert into the power socket 804 of the first LED module.

In some embodiments, the first lens cover is attached to the first light wing using a connection of the power socket and the power pin as illustrated in FIG. 11

In FIG. 5, the driver housing has an installation groove 685 for inserting the first light wing 602.

In some embodiments, the first light wing is rotatable with respect to the driver housing to change a direction of the first light. FIG. 5 shows that the second light wing 603 is rotated with respect to the driver housing 601.

In some embodiments, a rotation shaft 626 is used for fixing the first light wing to the driver housing.

In some embodiments, the first wing is operated with at least two rotation axes.

Figure 9A:
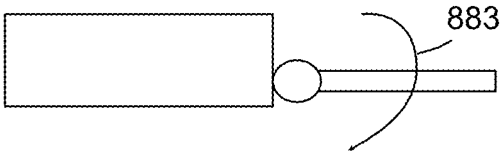
FIG. 9A, FIG. 9B and FIG. 9C show three operation statuses of rotation.
Figure 9B:
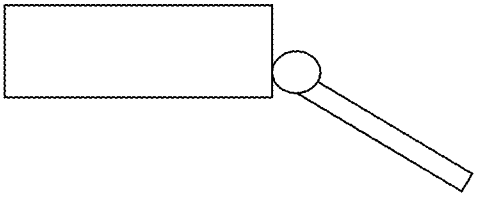
Figure 9C:
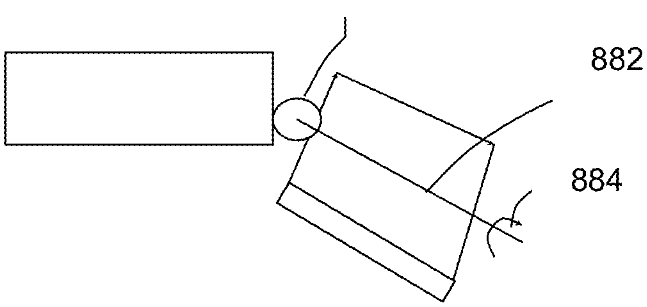

FIG. 9A, FIG. 9B and FIG. 9C show an example of such two rotation axes. FIG. 9A shows the light wing is rotated along a first axis 883. FIG. 9B shows a rotated result. FIG. 9C shows the light wing may further rotate along a second axis 882 for another rotation direction 884 along a shaft 881.

Figure 1:
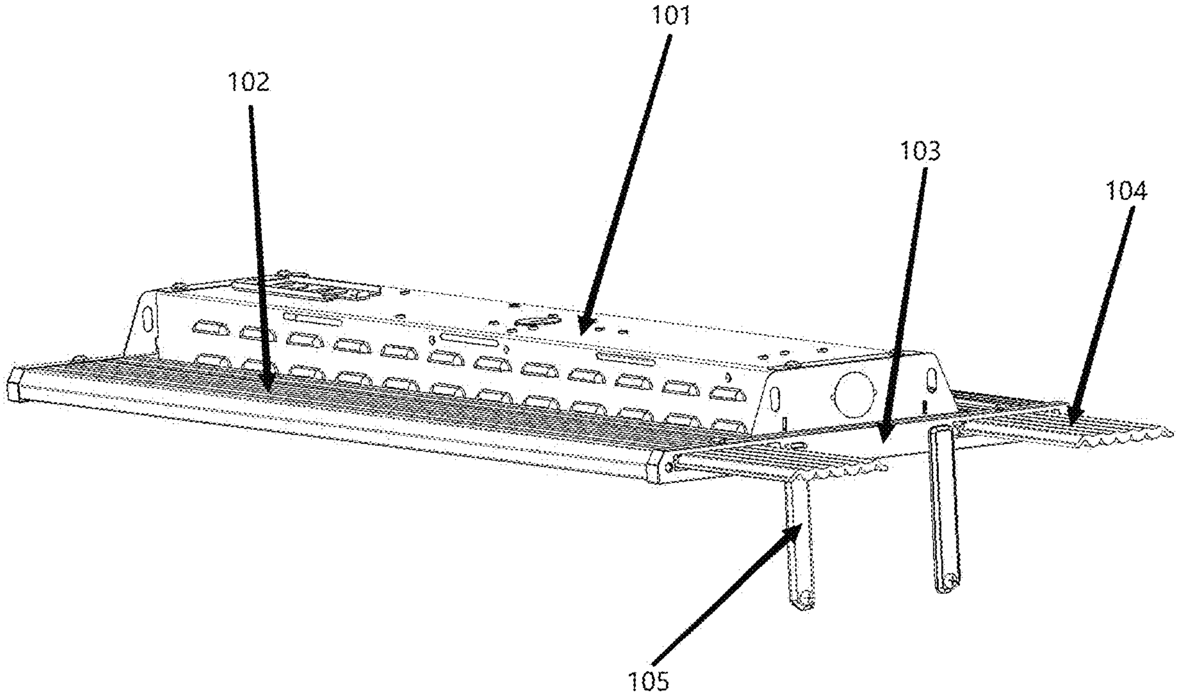
FIG. 1 illustrates a lighting apparatus embodiment.

As shown in FIG. 1, this utility model provides a light fixture with a quick lens replacement feature. The fixture includes a driver cavity 101, a lamp body 102, side covers 103, and a lens 104. The side covers 103 are located at both ends of the driver cavity 101, and the lamp body 102 is mounted on both sides of the driver cavity 101 through the side covers 103. Openings are provided on the side covers 103 at positions corresponding to the lamp body 102 for installing and removing the lens 104. Each opening is equipped with an end cap 105.

In specific embodiments, the side covers 103 attach the lamp body 102 to both sides of the driver cavity 101 using screws. The driver cavity 101 powers the lamp body 102 to emit light through the lens 104. Different lenses 104 have varying optical structures that can direct the light emitted from the lamp body 102 to different positions. Thus, when replacing lenses 104 with different light-guiding structures, the fixture can emit light at various angles.

In certain embodiments, a front-to-back through slot track is provided at the lower part of the lamp body 102, allowing the lens 104 to move horizontally along the slot track. An opening is aligned with the slot track on the side cover 103, allowing for quick installation and removal of the lens 104 through this opening. An end cap 105 is installed at the opening, which seals the lens 104 within the lamp body 102.

Figure 2:
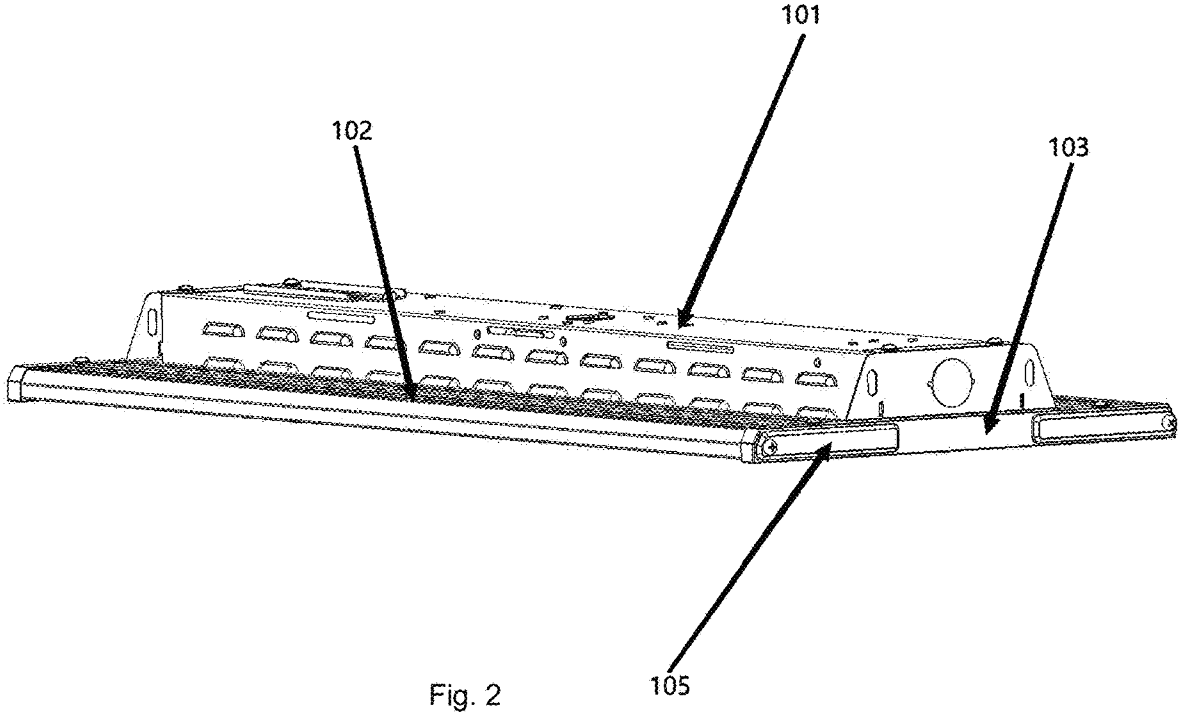
FIG. 2 illustrates another status of the embodiment in FIG. 1.

Please also refer to FIGS. 1 and 2, where FIG. 2 shows an assembly diagram of a light fixture with a quick lens replacement feature, according to an embodiment of this application.

In a specific embodiment, the lens 104 is fully inserted into the slot track of the lamp body 102. The end cap 105 is rotated to align with the side cover 103, and is secured to the side cover 103 with screws, fully sealing the lens 104 inside the lamp body 102.

In some embodiments, a detachable fit is used between the end cap 105 and the side cover 103. The entire fixture does not need to be disassembled; by simply removing the end cap 105, the lens 104 can be taken out from the slot track of the lamp body 102 and replaced with a lens 104 of a different light-guiding structure, allowing for versatile lighting configurations.

Figure 3:
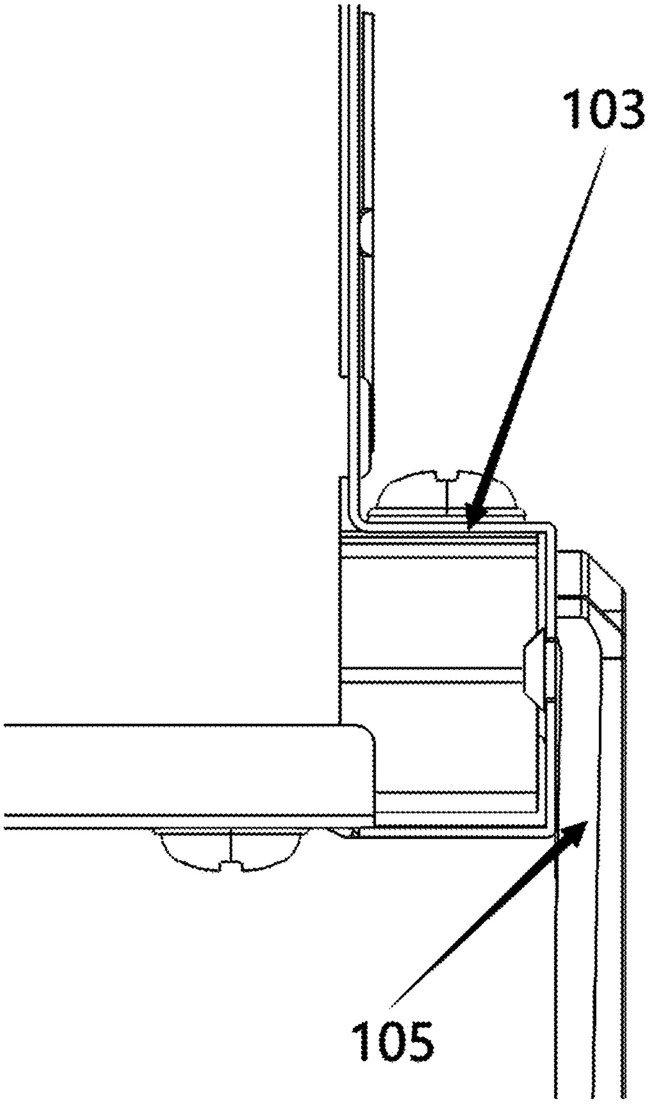
FIG. 3 illustrates a zoom-up view of a component connection.

FIG. 3 illustrates a schematic diagram of the end cap area structure of a light fixture with a quick lens replacement feature, according to an embodiment of this application.

In certain embodiments, one end of the end cap 105 engages with the side cover 103 in an embedded fit. Once assembled, the end cap 105 can rotate freely relative to the side cover 103. This structure enables the end cap 105 to rotate to a position aligned with the side cover 103's aperture.

Figure 4:
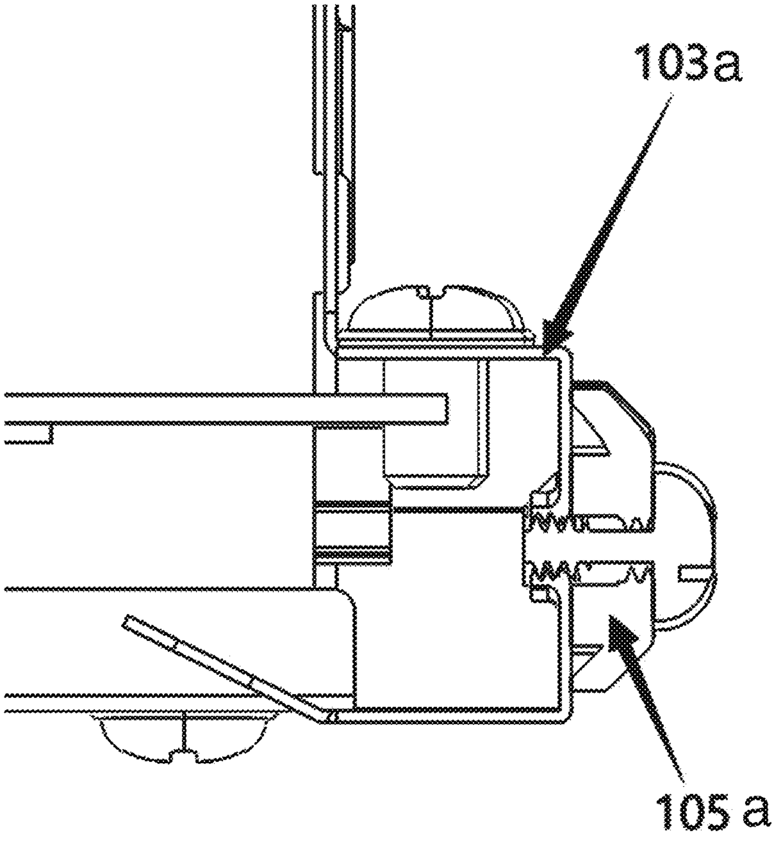
FIG. 4 illustrates another view of the example in FIG. 3.

FIG. 4 shows another schematic diagram of the end cap area structure of a light fixture with a quick lens replacement feature, according to an embodiment of this application.

In specific embodiments, one end of the end cap **105*a* engages with the side cover 103*a* via screws. Loosening the screws releases the end cap 105*a*, allowing it to rotate, after which the lens 104 inside the slot track of the lamp body 102** can be replaced.

In another embodiment, the end cap **105*a* has a screw hole at one end, with a blank area in the middle section of the screw hole. Loosening the screw enough for the threaded part to enter this blank area allows the end cap 105*a* to rotate, facilitating the replacement of the lens 104** without fully removing the screw, thereby preventing the loss of screws.

This application proposes a light fixture with a quick lens replacement feature, achieved by adding a front-to-back through slot track at the lower part of the lamp body and a small window on the side cover, along with a detachable end cap. This design allows for the quick replacement of lenses with different beam angles without needing to disassemble the entire fixture. The blank area in the middle of the screw hole on one end of the end cap, combined with the embedded design at the other end, enables end cap rotation and lens replacement without fully removing the screws. This feature reduces the risk of losing components during disassembly and improves installation and maintenance convenience, meeting user requirements for different lighting configurations in various scenarios.

In summary, the side end cap structure proposed in this design offers practical advantages in terms of consistent appearance, ease of use, and enhanced user experience.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a driver housing;

a first light wing disposed on a first side of the driver housing, the first light wing defining a first light opening and a first lens entrance;

a first LED module disposed in the first light wing and configured for emitting a first light;

a first lens plate disposed in the first light wing through the first lens entrance;

a first lens cover to concealing the first lens entrance;

a second light wing disposed on a second side of the driver housing, the second light wing defining a second light opening and a second lens entrance;

a second LED module disposed in the second light wing and configured for emitting a second light;

a second lens plate disposed in the second light wing through the second lens entrance; and a second lens cover for concealing the second lens entrance, wherein the first light passes through the first lens plate to escape from the first light opening, and the second light passes through the second lens plate to escape from the second light opening, wherein the first light wing is rotatable with respect to the driver housing to change a direction of the first light.

2. The lighting apparatus of claim 1, wherein the first lens plate is a first light guide plate, wherein the first LED module emits the first light into a first lateral surface of the first light guide plate, wherein the first lateral surface is perpendicular to the first light opening.

3. The lighting apparatus of claim 1, wherein the first lens plate has multiple convex-concave lens structure for diffusing the first light.

4. The lighting apparatus of claim 1, wherein the driver housing has an installation groove for inserting the first light wing.

5. The lighting apparatus of claim 1, wherein a rotation shaft is used for fixing the first light wing to the driver housing.

6. The lighting apparatus of claim 5, wherein the first wing is operated with at least two rotation axes.

7. The lighting apparatus of claim 1, wherein the first light wing has a first sliding track for sliding the first lens plate into the first light wing.

8. The lighting apparatus of claim 7, wherein the first siding track has multiple sub-tracks for placing the first lens cover with different distances to the first LED module.

9. The lighting apparatus of claim 8, wherein a first manual switch is disposed aside the first lens entrance for users to set a light setting of the first LED module, wherein the first manual switch is concealed by the first lens cover, wherein the first manual switch is exposed when the first lens cover is partly detached from the first lens entrance.

10. The lighting apparatus of claim 1, wherein the first LED module and the first lens plate are integrated as a replaceable module to be replaced from the first lens entrance.

11. The lighting apparatus of claim 10, wherein the lens cover has at least one electrode for routing a driving current from a driver in the driver housing to the first LED module.

12. The lighting apparatus of claim 11, wherein the first LED module has a power socket, wherein the first lens cover has a power pin to insert into the power socket of the first LED module.

13. The lighting apparatus of claim 12, wherein the first lens cover is attach to the first light wing using a connection of the power socket and the power pin.

14. The lighting apparatus of claim 1, wherein the first lens cover is operable to expose the first lens entrance for removing the first lens plate.

15. The lighting apparatus of claim 14, wherein the first lens entrance is located at a first lateral wall of the first light wing, wherein the first lens cover is attached to the first lateral wall with a first connector, wherein when the first lens cover is operated to expose the first lens entrance, the first connector is still attached to the first lateral wall.

16. The lighting apparatus of claim 15, wherein the first lens cover is made of elastic plastic material, and the first lens cover is squeezed to fit to the first lens entrance to conceal the first lens entrance.

17. The lighting apparatus of claim 15, wherein the first lens cover further has a first attaching unit, wherein the first attaching unit and the first connector are disposed on two sides of the first lens cover, wherein the first attaching unit and the first connector together attach the first lens cover to conceal the first lens entrance.

18. The lighting apparatus of claim 17, wherein the first attaching unit is a screw.

19. The lighting apparatus of claim 17, wherein the first attaching unit is an elastic block to squeeze into a lock hole aside the first lens entrance.

* * * * *